(12) United States Patent
Kimball, III et al.

(10) Patent No.: US 10,545,923 B1
(45) Date of Patent: Jan. 28, 2020

(54) REDUCING SKEW FOR DATABASE OPERATION PROCESSING WITH RANDOMIZATION

(71) Applicant: Teradata US, Inc, Dayton, OH (US)

(72) Inventors: Richard Leon Kimball, III, Atlanta, GA (US); Paul Laurence Sinclair, Manhattan Beach, CA (US); Grace Kwan-On Au, Rancho Palos Verdes, CA (US)

(73) Assignee: Teradata US, Inc., San Diego, CA (US)

( * ) Notice: Subject to any disclaimer, the term of this patent is extended or adjusted under 35 U.S.C. 154(b) by 231 days.

(21) Appl. No.: 15/847,236

(22) Filed: Dec. 19, 2017

(51) Int. Cl.
*G06F 16/16* (2019.01)
*G06F 16/178* (2019.01)

(52) U.S. Cl.
CPC .......... *G06F 16/178* (2019.01); *G06F 16/162* (2019.01)

(58) Field of Classification Search
CPC ............................ G06F 16/178; G06F 16/162
See application file for complete search history.

(56) References Cited

U.S. PATENT DOCUMENTS

| 5,121,494 | A | * | 6/1992 | Dias | G06F 16/24532 |
| 5,136,686 | A | * | 8/1992 | Koza | G06N 3/126 |
| | | | | | 706/13 |
| 8,195,644 | B2 | | 6/2012 | Xu | |
| 8,832,074 | B2 | | 9/2014 | Zhou et al. | |
| 9,460,152 | B2 | * | 10/2016 | Clifford | G06F 16/24537 |
| 9,852,181 | B2 | * | 12/2017 | Grochowski | G06F 16/2453 |
| 2010/0114870 | A1 | * | 5/2010 | Al-Omari | G06F 16/24524 |
| | | | | | 707/718 |
| 2012/0106844 | A1 | * | 5/2012 | Ramachandrula | H04N 1/3878 |
| | | | | | 382/173 |

* cited by examiner

*Primary Examiner* — Jorge A Casanova
(74) *Attorney, Agent, or Firm* — Howard L. Speight, PLLC

(57) ABSTRACT

A database operation is performed in a file system residing on a plurality of processing modules. The file system includes a first relation having a plurality of first-relation entries. Each of the plurality of first-relation entries has a first-relation attribute that is of interest in the database operation. A value of a distribution attribute in each of the first-relation entries is set to a unique value selected from among a domain of unique values. The first-relation entries of the first relation are redistributed among the plurality of processing modules based on the first-relation attribute and the distribution attribute. The computational operation is performed to produce a result.

18 Claims, 4 Drawing Sheets

REDUCING SKEW FOR DATABASE OPERATION PROCESSING WITH RANDOMIZATION

BACKGROUND

For a large relation in a file system residing on a plurality of processing modules, if the large relation is local (for instance a table or intermediate result relation stored locally on the processing modules) or hash redistributed (for instance on equality join conditions or GROUP BY expressions), the processing modules may have an uneven (or "skewed") number of rows to join or aggregate. This skew in the distribution of the rows in the processing modules can cause an imbalance in join or aggregation processing since some processing modules may have many more rows to process than other processing modules. The processing modules with fewer rows may finish first and be unused for further processing while the other processing modules continue processing. This leads to parallel inefficiency and a longer elapsed time to process the join or aggregation. Reducing the skew to achieve an improvement in parallel efficiency is a challenge.

SUMMARY

In one aspect, a method for performing a database operation in a file system residing on a plurality of processing modules is implemented. The file system includes a first relation having a plurality of first-relation entries. Each of the plurality of first-relation entries has a first-relation attribute that is of interest in the database operation. The method includes setting a value of a distribution attribute in each of the first-relation entries to a unique value selected from among a domain of unique values. The method includes redistributing the first-relation entries of the first relation among the plurality of processing modules based on the first-relation attribute and the distribution attribute. The method includes performing the computational operation to produce a result.

Implementations may include one or more of the following. The database operation may include one of a join, an aggregation, or a computational operation. The first-relation entries may be rows in the first relation and the first-relation attribute may be a column in the first-relation entries. The first-relation entries may include a plurality of first-relation attributes. The unique value assigned to the distribution attribute may be selected by one of a random selection or a round robin selection. The method may include adding the distribution attribute to the first-relation entries. The distribution attribute may include a plurality of attributes. The file system may include a second relation having a plurality of second-relation entries. Each of the plurality of second-relation entries may have a second-relation attribute that is of interest in the computational operation. The method may include making n copies of the second relation, where n is the number of unique values in the domain of unique values. The method may include redistributing each of the copies of the second relation to a respective processing module to which the first-relation entries of the first relation have been redistributed. Performing the computational operation may use the first relation and the second relation. Redistributing each of the copies of the second relation to a respective processing module to which the first-relation entries of the first relation were redistributed may include adding a number attribute to the second-relation entries and setting the number attribute for the second-relation entries for each respective copy of the second relation to a respective unique value selected from the domain of unique values. Redistributing each of the copies of the second relation to a respective processing module may include redistributing each of the copies based on the number attribute. Redistributing each of the copies of the second relation to a respective processing module to which the first-relation entries of the first relation have been redistributed may include copying a respective complete copy of the second relation to each of the processing modules. The first relation may have a first-relation-count of entries. The second relation may have a second-relation-count of entries. The number of processing modules in the plurality of processing modules may be a processing-module-count. n may be determined based on the first-relation-count, the second-relation-count, and the processing-module-count.

A method for performing a database operation in a file system residing on a plurality of processing modules is implemented. The file system includes a first relation having a plurality of first-relation entries. Each of the plurality of first-relation entries has a first-relation attribute that is of interest in the database operation. The file system includes a second relation having a plurality of second-relation entries. Each of the plurality of second-relation entries has a second-relation attribute that is of interest in the computational operation. The method includes setting a value of a distribution attribute in each of the first-relation entries to a unique value selected from among a domain of unique values. The method includes redistributing the first-relation entries of the first relation among the plurality of processing modules based on the first-relation attribute and the distribution attribute. The method includes making n copies of the second relation, where n is the number of unique values in the domain of unique values. The method includes redistributing each of the copies of the second relation to a respective processing module to which the first-relation entries of the first relation by setting a number attribute for the second-relation entries for each respective copy of the second relation to a respective unique value selected from the domain of unique values, and redistributing each of the copies of the second relation based on the number attribute. The method includes performing the computational operation to produce a result.

Implementations may include one or more of the following. The database operation may include one of a join, an aggregation, or a computational operation. The file system may include one of a relational database system, a hierarchical database system, a columnar database system, or a shared-nothing database system. The first-relation entries are rows in the first relation and the first-relation attribute is a column in the first-relation entries. The first-relation entries may include a plurality of first-relation attributes. The unique value assigned to the distribution attribute may be selected by one of a random selection or a round robin selection. The method may include adding the distribution attribute to the first-relation entries. The method may include adding the number attribute to the second-relation entries. The distribution attribute may include a plurality of attributes. The first relation may have a first-relation-count of entries. The second relation may have a second-relation-count of entries. The number of processing modules in the plurality of processing modules may be a processing-module-count. n may be determined based on the first-relation-count, the second-relation-count, and the processing-module-count.

DETAILED DESCRIPTION

The following detailed description illustrates embodiments of the present disclosure. These embodiments are described in sufficient detail to enable a person of ordinary skill in the art to practice these embodiments without undue experimentation. It should be understood, however, that the embodiments and examples described herein are given by way of illustration only, and not by way of limitation. Various substitutions, modifications, additions, and rearrangements may be made that remain potential applications of the disclosed techniques. Therefore, the description that follows is not to be taken as limiting on the scope of the appended claims. In particular, an element associated with a particular embodiment should not be limited to association with that particular embodiment but should be assumed to be capable of association with any embodiment discussed herein.

Figure 1:
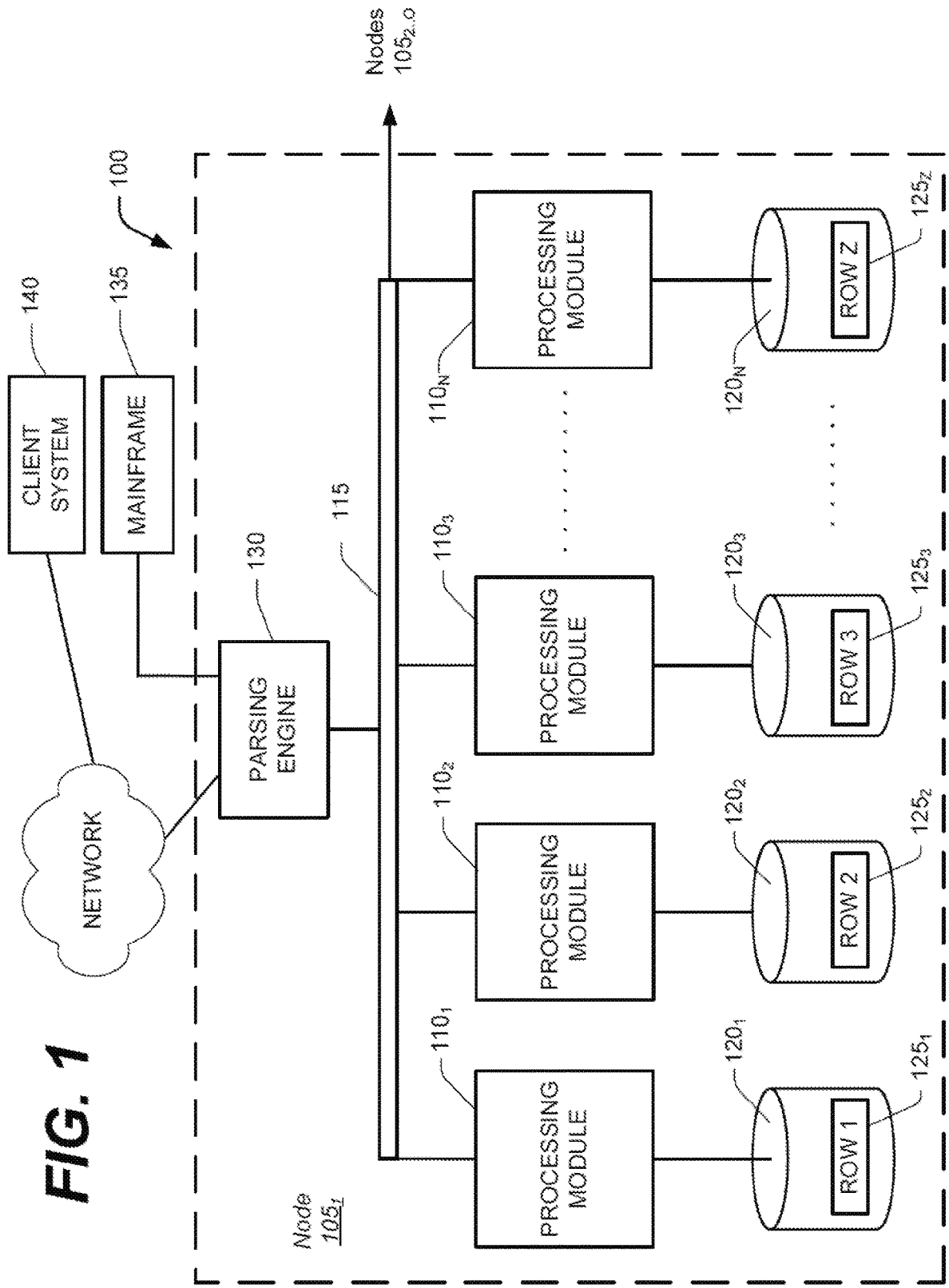
FIG. 1 is one example of a block diagram of a node of a database system.

The skew reduction technique disclosed herein has particular application, but is not limited, to large databases that might contain many millions, or billions of records managed by a database system ("DBS") 100, such as a Teradata Active Enterprise Data Warehouse available from Teradata. FIG. 1 shows sample architecture for one node $105_1$ of the DBS 100. The DBS node $105_1$ includes one or more processing modules $110_{1 \ldots N}$, connected by a network 115, that manage the storage and retrieval of data in data-storage facilities $120_{1 \ldots N}$. Each of the processing modules $110_{1 \ldots N}$ may be one or more physical processors, or each may be a virtual processor, with one or more virtual processors running on one or more physical processors. In Teradata nomenclature, the processing modules are known as Access Module Processors ("AMPs").

For the case in which one or more virtual processors are running on a single physical processor, the single physical processor swaps between the set of N virtual processors.

For the case in which N virtual processors are running on an M-processor node, the node's operating system schedules the N virtual processors to run on its set of M physical processors. If there are 4 virtual processors and 4 physical processors, then typically each virtual processor would run on its own physical processor. If there are 8 virtual processors and 4 physical processors, the operating system would schedule the 8 virtual processors against the 4 physical processors, in which case swapping of the virtual processors would occur.

Each of the processing modules $110_{1 \ldots N}$ manages a portion of a database that is stored in a corresponding one of the data-storage facilities $120_{1 \ldots N}$. Each of the data-storage facilities $120_{1 \ldots N}$ includes one or more disk drives. The DBS may include multiple nodes $105_2 \ldots 0$ in addition to the illustrated node $105_1$, connected by extending the network 115.

The system may store data in one or more relations (or tables) in the data-storage facilities $120_{1 \ldots N}$. The entries (or rows) $125_{1 \ldots Z}$ of the relations are stored across multiple data-storage facilities $120_{1 \ldots N}$ to ensure that the system workload is distributed evenly across the processing modules $110_{1 \ldots N}$. A parsing engine 130 organizes the storage of data and the distribution of relation entries $125_{1 \ldots Z}$ among the processing modules $110_{1 \ldots N}$. Each entry is made up of attributes (or columns). The parsing engine 130 also coordinates the retrieval of data from the data-storage facilities $120_{1 \ldots N}$ in response to queries received from a user at a mainframe 135 or a client computer 140. The DBS 100 usually receives queries (or requests) and commands to build tables in a standard format, such as SQL.

In one or more implementations, the entries $125_{1 \ldots Z}$ are distributed, in a process called "redistribution," across the data-storage facilities $120_{1 \ldots N}$ by the parsing engine 130 in accordance with the primary index of the table. The primary index defines the attributes of the entries that are used for calculating a hash value. The function that produces the hash value from the values in the attributes specified by the primary index is called the hash function. Some portion, possibly the entirety, of the hash value is designated a "hash bucket". The hash buckets are assigned to respective data-storage facilities $120_{1 \ldots N}$ and associated processing modules $110_{1 \ldots N}$ by a hash bucket map. The characteristics of the attributes chosen for the primary index determine how evenly the rows are distributed.

In addition to the physical division of storage among the storage facilities illustrated in FIG. 1, each storage facility may be logically organized. One implementation divides the storage facilities into logical blocks of storage space, i.e., partitions. Other implementations can divide the available storage space into different units of storage. The logical units of storage can ignore or match the physical divisions of the storage facilities.

Figure 2:
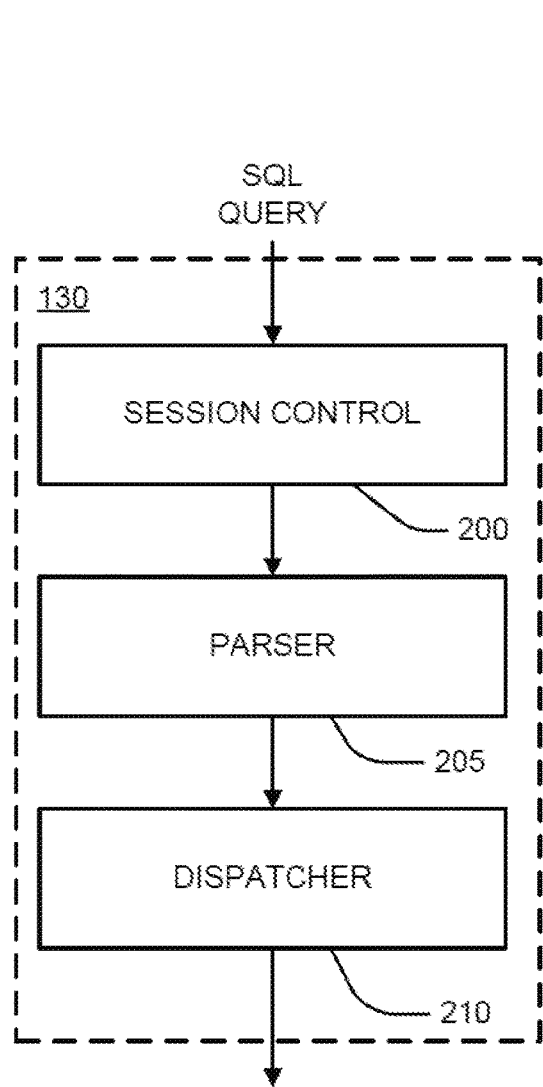
FIG. 2 is one example of a block diagram of a parsing engine.

In one example system, illustrated in FIG. 2, the parsing engine 130 is made up of three components: a session control 200, a parser 205, and a dispatcher 210. The session control 200 provides the logon and logoff function. It accepts a request for authorization to access the database, verifies it, and then either allows or disallows the access.

Figure 3:
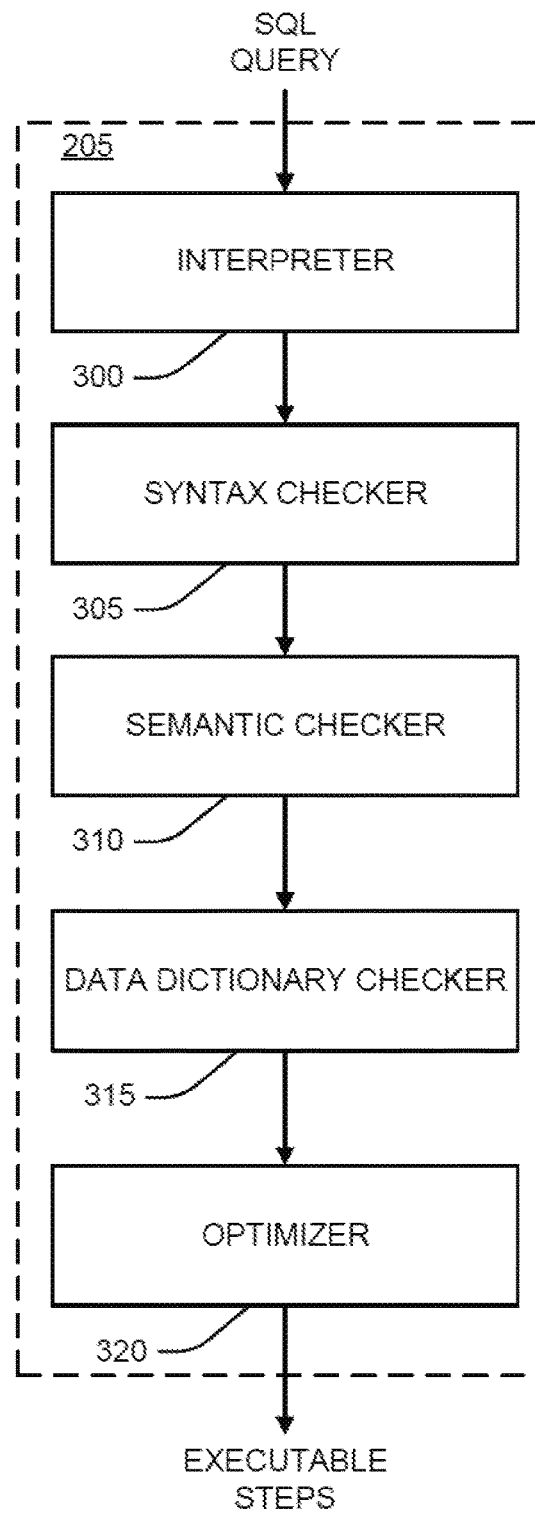
FIG. 3 is one example of a block diagram of a parser.

Once the session control 200 allows a session to begin, a user may submit a SQL query, which is routed to the parser 205. As illustrated in FIG. 3, the parser 205 interprets the SQL query (block 300), checks it for proper SQL syntax (block 305), evaluates it semantically (block 310), and consults a data dictionary to ensure that all the objects specified in the SQL query exist and that the user has the authority to perform the request (block 315). Finally, the parser 205 runs an optimizer (block 320), which develops the least expensive plan to perform the request and produces executable steps to execute the plan. A dispatcher 210 issues commands to the processing modules $110_{1 \ldots N}$ to implement the executable steps.

The file system may be a relational database system, a hierarchical database system, a columnar database system, a shared-nothing database system, other types of file systems or databases, or combinations of these types of file systems or databases.

The DBS 100 shown in FIG. 1 is an example of a shared-nothing relational database in which each processing modules $110_{1 \ldots N}$ has access only to the portion of the database that is stored in a corresponding one of the data-storage facilities $120_1 \ldots _N$. Therefore, for a database operation, such as a join, an aggregation, or a computational operation, between two tables to occur, the two tables, or at least the portions of the two tables of interest in the database operation, must reside on the same data-storage facility. Often, the tables can be divided among the data-storage facilities $120_1 \ldots _N$ so that multiple processing modules $110_1 \ldots _N$ can work on the database operation simultaneously.

In a shared-nothing relational database such as the DBS 100, skew in the distribution of a large relation among the data-storage facilities $120_1 \ldots _N$ can negatively impact parallel efficiency of a join or aggregation. The technique described herein uses randomization in redistributing the rows of a large table to reduce skew. The optimizer will consider this technique among other techniques such as the Partial Redistribution/Partial Duplication (PRPD) and choose the technique that satisfies a selection criterion, such as, for example, the lowest overall cost.

Figure 4A:
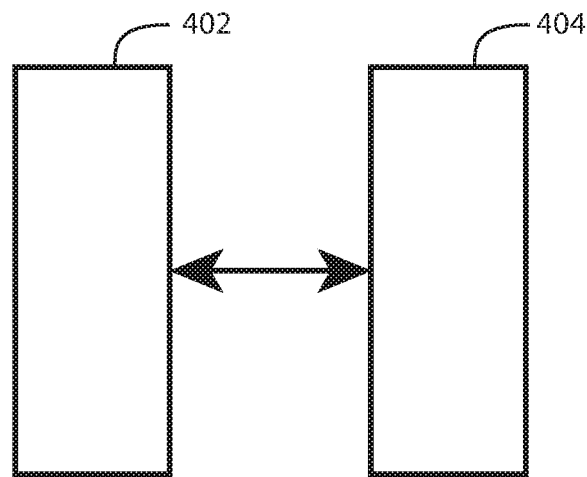
FIG. 4A is an illustration of a large relation to small relation join.
Figure 4B:
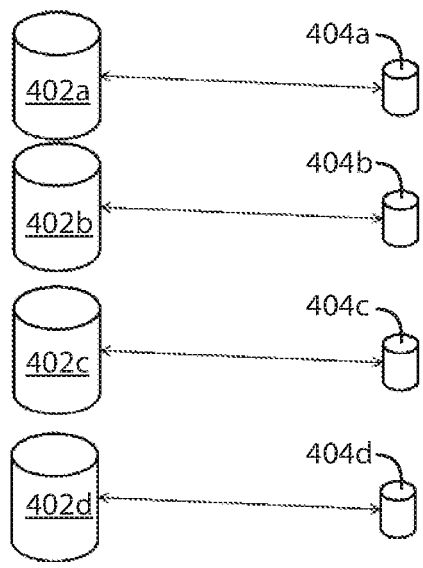
FIG. 4B illustrates a join between the large relation and the small relation when the large relation is evenly distributed among the data-storage facilities.

FIG. 4A is an illustration of a large relation to small relation join. To illustrate the skew problem, consider a join between a large relation 402 and a small relation 404. FIG. 4B illustrates a join between the large relation and the small relation when the large relation is evenly distributed among the processing modules. When the large relation 402 is evenly distributed among the processing modules (i.e., large relation distributions 402a, 402b, 402c, and 402d are approximately the same size) and the small relation 404 is duplicated to the processing modules (i.e., small relation distribution 404a, 404b, 404c, and 404d are duplicates of relation 404) to perform, for example, a dynamic hash join or a product join, the join becomes many "small" table to small table joins that provide high parallel efficiency.

Figure 4C:
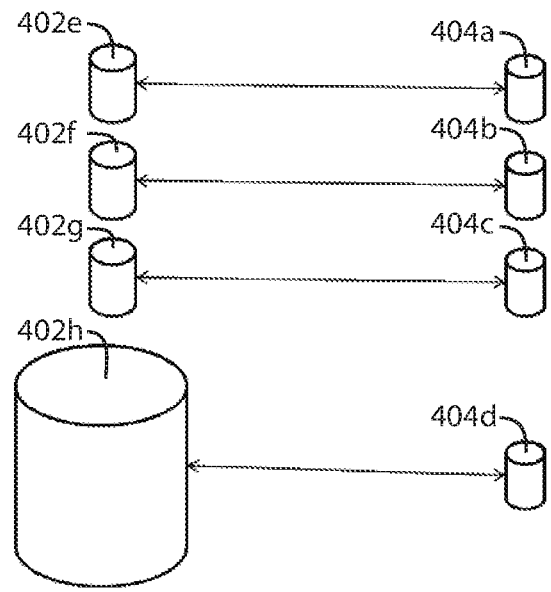
FIG. 4C illustrates a join between the large relation and the small relation when the distribution of the large relation is skewed.

FIG. 4C illustrates a join between the large relation and the small relation when the distribution of the large relation is skewed. When the rows in the large relation 402 are skewed in their distribution, some processing modules may have many more rows that other processing modules (i.e., large relation distributions 402e, 402f, and 402g may be much smaller than large relation distribution 402h) leading to parallel inefficiency and a longer elapsed time to complete the join.

Use of the Technique in Joins

The skew in the large relation 402 (the technique will also work for the small relation 404) can potentially be reduced by a factor of n by:

creating a distribution attribute in the large relation 402, setting the value of the distribution attribute in each of the large relation entries to a unique value selected from among a domain of n unique values, and redistributing the entries of the large relation 402 among the plurality of processing modules based on the first-relation attribute of interest in the join and the distribution attribute.

Consider the example shown below in Table 1 which illustrates a relation that contains entries (i.e., rows), each entry having an attribute (i.e., columns), i.e., the "Original Attribute" that is of interest in the join (e.g., is an attribute in an equality condition in the join. The technique is not limited to a single attribute of interest but may include multiple attributes of interest.

TABLE 1

| Original Attribute |
| --- |
| ABC |
| DEF |

TABLE 1-continued

| Original Attribute |
| --- |
| GHI |
| JKL |
| DEF |
| DEF |
| DEF |
| GHI |
| ABC |
| JKL |
| JKL |
| GHI |
| JKL |
| ABC |
| ABC |
| DEF |
| DEF |
| ABC |
| DEF |
| ABC |
| JKL |
| DEF |
| JKL |
| DEF |
| ABC |
| DEF |
| GHI |
| JKL |

In the example shown in Table 1, the "Original Attribute" has 4 unique values (ABC, DEF, GHI, and JKL). The relation has a total of 29 entries, 8 having a value of "ABC" in the "Original Attribute", 10 having a value of "DEF" in the "Original Attribute," 4 having a value of "GHI" in the "Original Attribute," and 7 having a value of "JKL" in the "Original Attribute." Thus, the values in the "Original Attribute" are not evenly spread among the entries and a distribution based on this column would introduce the skew described above. For example, if a hash function directs entries with the "Original Attribute" having values of "ABC" or "DEF" to processing module 1 and entries with the "Original Attribute" having values of "GHI" or "JKL" to processing module 2, skew would result; 18 entries would be hashed to processing module 1 and 11 entries would be hashed to processing module 2. Note that the skew could be more dramatic than illustrated in Table 1.

A distribution attribute may be added to the relation and the value of the distribution attribute in each of the entries may be set to a unique value selected from among a domain of n unique values.

Alternatively, the distribution attribute may be a currently-existing attribute in the relation and the currently-existing attribute may not be of interest to the join. In the example shown in FIG. 2, n is 4 and the domain of n unique values is $\{1, 2, 3, 4\}$:

TABLE 2

| Original Attribute | Distribution |
| --- | --- |
| ABC | 4 |
| DEF | 2 |
| GHI | 3 |
| JKL | 1 |
| DEF | 1 |
| DEF | 3 |
| DEF | 4 |
| GHI | 1 |
| ABC | 4 |
| JKL | 3 |
| JKL | 4 |
| GHI | 1 |

TABLE 2-continued

| Original Attribute | Distribution |
|---|---|
| JKL | 4 |
| ABC | 1 |
| ABC | 3 |
| DEF | 1 |
| DEF | 4 |
| ABC | 3 |
| DEF | 2 |
| ABC | 4 |
| JKL | 2 |
| DEF | 2 |
| JKL | 3 |
| DEF | 2 |
| ABC | 4 |
| DEF | 2 |
| GHI | 1 |
| JKL | 2 |

The use of numbers for the domain of n unique values is arbitrary. The n unique values can be numbers, characters, symbols, or any other value that can be represented in a database. Alternatively, the values may be generated by a random number generator or a pseudo-random number generator. For example, in the example shown in Table 2, the value to include in the distribution attribute could be generated by a pseudo-random number generator, which is available in many database systems, that randomly generates an output of 1, 2, 3, or 4.

The value to include in the distribution attribute could be randomly selected from a known domain of unique values, such as {1,2,3,4}, or the value could be selected on a round-robin basis (i.e., the first value, followed by the second value, etc., until all of the values have been used, and then repeating) or on a modification of a round-robin selection (e.g., choose values in odd-numbered slots in the domain of unique value, followed by values in even-numbered slots, and then repeating), or using a similar technique. Further, the distribution attribute may be split among two or more attributes.

The relation shown in Table 2 may be distributed among the processing modules based on the distribution attribute. For example, if a hash function directs entries with the distribution attribute having values of "1" and "2" to processing module 1 and entries with the distribution attribute having values of "3" and "4" to processing module 2, 15 entries would be distributed to processing module 1 and 14 entries would be distributed to processing module 2. While such a scheme may be useful to reduce the skew in the distribution of the relation, some database operations require distribution based on an attribute other than the distribution attribute.

In some joins in which the original attribute is an attribute of interest in the join, such as an equality join in which the original attribute is one of the attributes specified in the equality, it is useful to distribute the entries based on the original attribute. In such a circumstance, the original attribute and the distribution attribute may be combined as shown in Table 3:

TABLE 3

| Original Attribute | Distribution Attribute | Combination |
|---|---|---|
| ABC | 4 | (ABC,4) |
| DEF | 2 | (DEF,2) |
| GHI | 3 | (GHI,3) |

TABLE 3-continued

| Original Attribute | Distribution Attribute | Combination |
|---|---|---|
| JKL | 1 | (JKL,1) |
| DEF | 1 | (DEF,1) |
| DEF | 3 | (DEF,3) |
| DEF | 4 | (DEF,4) |
| GHI | 1 | (GHI,1) |
| ABC | 4 | (ABC,4) |
| JKL | 3 | (JKL,3) |
| JKL | 4 | (JKL,4) |
| GHI | 1 | (GHI,1) |
| JKL | 4 | (JKL,4) |
| ABC | 1 | (ABC,1) |
| ABC | 3 | (ABC,3) |
| DEF | 1 | (DEF,1) |
| DEF | 4 | (DEF,4) |
| ABC | 3 | (ABC,3) |
| DEF | 2 | (DEF,2) |
| ABC | 4 | (ABC,4) |
| JKL | 2 | (JKL,2) |
| DEF | 2 | (DEF,2) |
| JKL | 3 | (JKL,3) |
| DEF | 2 | (DEF,2) |
| ABC | 4 | (ABC,4) |
| DEF | 2 | (DEF,2) |
| GHI | 1 | (GHI,1) |
| JKL | 2 | (JKL,2) |

In a relation with multiple attributes of interest, the distribution attribute may be combined with one or more of the multiple attributes of interest to produce the combination attribute in Table 3.

In a system with two processing modules, a hashing function could be established with the mapping shown in Table 4 (which is merely an example):

TABLE 4

| Attribute value | Processing module |
|---|---|
| (ABC,1) | 1 |
| (ABC,2) | 2 |
| (ABC,3) | 1 |
| (ABC,4) | 2 |
| (DEF,1) | 1 |
| (DEF,2) | 1 |
| (DEF,3) | 2 |
| (DEF,4) | 2 |
| (GHI,1) | 1 |
| (GHI,2) | 2 |
| (GHI,3) | 2 |
| (GHI,4) | 1 |
| (JKL,1) | 2 |
| (JKL,2) | 1 |
| (JKL,3) | 2 |
| (JKL,4) | 2 |

The result would be 16 entries being mapped to processing module 1 and 13 entries being mapped to processing module 2. It will be understood that for very large relations, such as those typically found in enterprise data warehouses, the reduction in skew will be even more striking. Further, the reduction in skew will approach being reduced by a factor of n as the skew in the large relation 402 at the beginning of the process is more evenly spread among the values of the values of the original attribute. That is, if each of the values of the original attribute is originally mapped to a different processing module, the skew reduction resulting from the application of the technique described herein will approach a factor of n.

Returning to the join illustrated in FIG. 4A, the small relation 404 has a plurality of small-relation entries. Each of the plurality of small-relation entries has a second-relation attribute that is of interest in the join. The technique proceeds by making n copies of the small relation, where n is the number of unique values in the domain of unique values. In the example discussed above, n=4. A number attribute is added to the small-relation entries. Note that the number attribute may be added to the small-relation entries before n copies of the small relation are made. Alternatively, the number attribute may be a currently-existing attribute in the small relation and the currently-existing attribute may not be of interest to the join.

The number attribute for the small-relation entries for each respective copy of the small relation is set to a respective unique value selected from the domain of unique values. For example, the number attribute for all entries in the first copy of the small relation may be set to the first value in the domain of unique values, the number attribute for all entries in the second copy of the small relation may be set to the second value in the domain of unique values, the number attribute for all entries in the third copy of the small relation may be set to the third value in the domain of unique values, and so on. It will be understood that the number attribute for the entries in the first copy of the small relation may be set to another value in the domain of unique values, i.e., not the first value in the domain of unique values, and that the same is true for all the copies of the small relation. A different copy of the small relation may be created for each value in the domain of unique values and the number attribute of each entry in each copy of the small relation may be set to the value of the domain of unique values associated with that copy of the small relation. Each of the copies of the second relation is redistributed based on the number attribute and the small-relation attribute of interest to the join.

As a result, the entries from the large relation 402 and the small relation 404 necessary to proceed with the join are collocated on the same processing module 110, as illustrated in Table 5:

TABLE 5

| Entries on Processing Module 1 | | Entries on Processing Module 2 | |
|---|---|---|---|
| Large relation | Small relation | Large relation | Small relation |
| (ABC,1) | (ABC,1) | (JKL,1) | (JKL,1) |
| (DEF,1) | (DEF,1) | (DEF,3) | (DEF,3) |
| (DEF,1) | (GHI,1) | (GHI,3) | (GHI,3) |
| (GHI,1) | | (JKL,3) | (JKL,3) |
| (GHI,1) | | (JKL,3) | |
| (GHI,1) | | (ABC,4) | (ABC,4) |
| (DEF,2) | (DEF,2) | (ABC,4) | (DEF,4) |
| (DEF,2) | (JKL,2) | (ABC,4) | (JKL,4) |
| (DEF,2) | | (ABC,4) | |
| (DEF,2) | | (DEF,4) | |
| (DEF,2) | | (DEF,4) | |
| (JKL,2) | | (JKL,4) | |
| (JKL,2) | | (JKL,4) | |
| (ABC,3) | (ABC,3) | | |
| (ABC,3) | | | |

Optionally, at this point, duplicate rows that differ only by the added attribute shown in Table 5 can be removed.

With the large relation 402 and the small relation 404 distributed as shown in Table 5, the join can proceed efficiently. Further efficiencies can be achieved by partitioning the data in the processing modules. For example, the data in Table 5 could be partitioned on the unique number portion of the entries (i.e., the y in the (xxx,y) tuple shown in Table 5). If such partitioning were employed, the first 6 rows of entries (i.e., those with y=1) shown under Processing Module 1 in Table 5 would be partitioned to a first partition, the next 7 rows of entries (i.e., those with y=2) would be partitioned to a second partition, and the last 2 rows of entries (i.e., those with y=3) would be partitioned to a third partition. In Processing Module 2 in Table 5, the first row would be (i.e., the row with y=1) would be partitioned to a first partition, the next 4 rows (i.e., the rows with y=3) would be partitioned to a second partition, and the last 8 rows (i.e., the rows with y=4) would be partitioned to a third partition.

The redistribution of the small relation 404 proceeds as described above if n is less than the number of processing modules $110_{1...N}$ and the join includes equality conditions, n copies of each row of the small relation with a column indicating the copy number from 1 to n, respectively. If n equals the number of processing modules $110_{1...N}$ or there are no equality conditions in the join, the small relation is simply duplicated to all processing modules $110_{1...N}$. Sorting on hash of the join attributes is done if the join to be used is a merge join. Then the entries are joined on each processing module $110_{1...N}$ (the database could run serially or, using partitioning, in parallel) joining on the original join entries, if any, plus an equality join on the entries that are added to each of the two relations during the redistribution if n is less than the number of processing modules $110i...N$ and duplicate rows in the small relation are not removed.

This technique to reduce skew may be costed and compared to other possible plans and chosen if it has the least cost. For example, this technique may require additional scans, redistributions, writing of spools, larger rows, and making copies of the small relations rows compared to a plan that can directly join the relations. The improvement to the joins due to skew reduction might not offset this additional overhead. However, in some cases, this overhead might not be significant. For example, redistribution might not add a significant overhead compared, for example, to a plan that locally spools (and may provide improved parallel efficiency by reducing the skew in writing the spool as well as for the join).

The number of entries per processing module after duplication or redistributing the copies of the rows of the small relation 704 is at most the number of rows in the small relation 704 and can be much smaller if there are equality join conditions and n is less than the number of processing modules. In the latter case, n copies of the small relation are made rather than n duplicate copies per processing module. This results in n copies in total that are hash distributed across the processing modules. For example, with a small relation 704 with 10,000 rows on system with 2,500 processing modules, 10 copies of the small relation 704 would produce about 40 rows per AMP (and four rows per primary key and copy number per processing module). If duplicates are removed, this would reduce to about 10 rows per processing module.

The added column for hash redistribution can be BYTEINT if n is less than 128, SMALLINT if n is less than 32768, and otherwise INTEGER. This column does not actually have to be added to each row of either relation if the small relation is duplicated or, if the small relation originally does not have duplicate rows (for example, a SET table or a unique constraint) and duplicate copies of rows are removed on each processing module after the redistribution.

Choosing n

Depending on what information is available to the optimizer, the value n chosen could be based on the set of skewed values and their frequencies for any equality join conditions of the large relation, the processing module skew for the large relation (if coming from a table or would be currently spooled locally) for a non-equality join, the number of entries in the large relation (RL), the number of rows in the small relation (RS), and the number of processing modules (A). These can be obtained through estimates, collected statistics, dynamic statistics, etc. The value n would be limited no more than the number of processing modules because a larger n would not generally further improve the skew reduction. Note that the number of processing modules should be greater than 1 for this method to be useful.

For example (considering an equality join and only the most skewed value and its frequency—HMF), initially choose n such that $HMF/n<0.05\times RL$, then reduce n to be no more than A, and further reduce as needed so that $n\times RS<0.05\times RL$ to determine the final n to be used. If $n<=1$, this plan is not chosen. A smaller value of n might be chosen if minimal information to determine the value is available or the confidence in the information is low.

Collisions

For a small number of processing modules, the technique could still lead to uneven redistribution or an even more skewed distribution. For example, with 4 processing modules, n=2, the skewed value of x in the large relation 702 for an equality join condition, redistributing on (x, 1) and (x, 2) has a 25% probability of putting all the rows with a value of x on the same processing module (i.e., a "collision" or, in Teradata nomenclature, an "AMP collision") and thereby not reduce the skew. There is a 75% probability that those rows will be split across two processing modules to obtain the desired reduction in skew by half.

To avoid this issue, the technique could be limited to being used if there is a relatively large number of processing modules. However, even with a relatively large number of processing modules, there is non-zero probability of collisions.

Alternatively, collisions may be avoided by, instead of directly using the values from the domain of unique values for the redistribution of the large relation 704, using those values to index into an array K[ ], and using values from the array for the redistribution. The values in the array may be chosen such that each combination of a skewed value and a value from the array would not cause a collision. This assumes the set of the most skewed values are known. One simple algorithm is for K[1] is to start with a value of 0 increasing by 1 until a value is found that does not result in any collisions for the skewed values. Then for K[2], continue with K[1]+1 until a value is found that does not result in any collisions. And repeat for each K[ ] entry until the value for K[n] is determined. This assumes the number of values in the set of skewed values, "s," times n is not greater than the number of processing modules. If this is not the case, there will be collisions. If the number of processing modules is exceeded, the values in K[ ] are chosen to minimize the number of collisions per processing module so that for any specific processing module, the number of collisions is either FLOOR or CEILING of (s*n+number of processing modules)/(number of processing modules).

Other methods or refinements to avoiding AMP collisions (or picking the values in K[ ] as to better balance the redistributions of rows when AMP collisions cannot be avoided by considering the frequencies of each of the skewed values) may be possible.

Data Block Redistribution with Non-Equality Joins

For a non-equality join, instead of distributing rows of the large relation as described above, data blocks of entries can be distributed as described above for more efficient redistribution without a significant increase in skew as long as the large relation 402 has a relatively large number of data blocks compared to the number of processing modules.

Parallel Execution on an AMP Using Partitioning

By partitioning the large relations rows on each processing module, as discussed above regarding Table 5, actions to do a join for each partition can be generated to be run in parallel. The rows of the small relation 702 would also be partitioned if the join condition includes the added column with the copy number and the partitioning would be based on the added column in each of the two relations. In the case of a Teradata system, the usual limits on how many actions can be running at one time in parallel would apply. Alternatively, a single action could initiate some number of threads to process partitions in parallel. The joins running in parallel will write their results to the same spool or the separate spools may be written with extra retrieve steps to combine the spools into one spool. With separate spools, other operations could be applied to the spools in parallel when possible and combining the results could be delayed.

Parallel execution on a processing module using partitioning is not specific to the skew reduction technique described herein but could be applicable to other joins and other database operations.

Other Use Cases

The technique described herein could be extended to cases where there is skew in both relations. That is, the skew reduction technique may be applied using n to reduce skew in a first relation (with n copies of the second relation) and m for reducing the skew in the second relation (with m copies of the first relation). However, the increase in number of rows to process may outweigh any benefits derived from reducing skew in the two relations.

The technique described herein could be extended to cases where there is skew in one or both relations and the relations are of more or less equal size or the skew is in the smaller relation. However, the increase in number of rows to process may outweigh any benefits derived from reducing skew in the relations.

With a large relation to small relation join, processing of n copies of the small relation would be expected to be a fraction of the cost of processing the large relation and so can be potentially be offset by the improvements derived from reducing skew in the large relation in many cases. This disclosure focuses on that case as the main use case.

Simulation Techniques for a Join

The following is a query example for an equality join (mentioned above):
   SELECT fact.a_col, dim.some_col
   FROM fact_table_with_badly_skewed_FK fact,
     reference_table dim
   WHERE fact.FK_col=dim.PK_col;

The following is a rewritten query to simulate the proposed technique to reduce skew:
   SELECT fact.a_col, dim.some_col
   FROM (SELECT f.*, RANDOM(1,n) AS r FROM
     fact_table_with_badly_skewed_FK f)fact,
     RETRIEVE_copy(reference_table, n) dim
   WHERE fact.FK_col=dim.PK_col
     AND fact.r=dim.c;

where RETRIEVE_copy represents using the enhanced retrieved step to retrieve the rows from the reference_table (i.e., the small relation 404) and make n copies of each row retrieved and adding the column c with the copy number. Note that, in this simulation, extra retrieve steps occur with the current Teradata Database compared to the technique described herein. For instance, the derived table would be spooled locally and then redistributed in the simulation with the current Teradata Database.

The following rewritten query can be used to simulate the above in regard to making the 10 copies of rows from the reference_table.

SELECT fact.a_col, dim.some_col
FROM (SELECT f.*, RANDOM(1,n) AS r FROM
fact_table_with_badly_skewed_FK f)fact, (SELECT
t.*, c
FROM reference_table t CROSS JOIN
(SELECT EXTRACT(DAY FROM cdate) AS
c—these are integers 1 thru 10
FROM SYS_CALENDAR.CALDATES
WHERE cdate IN (1150101, 1150102, 1150103,
1150104, 1150105, 1150106, 1150107, 1150108,
1150109, 1150110)) dim
WHERE fact.FK_col=dim.PK_col
AND fact.r=dim.c;

Other alternative simulation rewrites could be to use a recursive query on the reference_table or build a table of n rows with the value 1 through n to which to cross join to the reference table.

Variations on this simulation technique can be used to demonstrate the skew reduction and the potential for performance improvement for various queries and data skew. The technique is expected to provide further performance improvement by not having extra retrieve steps, more efficient generation of copies of the small relation's rows, and other internal implementation efficiencies. The cost of the extra retrieve steps can be determined during simulation by examining step information and deducting those costs from the overall cost of the simulation to provide a better estimate of the improvement that can be expected for a query using the new method.

Use of the Technique in Aggregations

The technique is now discussed in relation to aggregations.

The skew in the large relation 402 used in an aggregation can potentially be reduced by a factor of n by:
creating a distribution attribute in the large relation 402,
setting the value of the distribution attribute in each of the large relation entries to a unique value selected from among a domain of n unique values, and
redistributing the entries of the large relation 402 among the plurality of processing modules based on the first-relation attribute of interest in the aggregation and the distribution attribute.

The rows are locally aggregated on each processing module (the database could run the steps serially or, using partitioning, in parallel). If there is a GROUP BY, the result of the aggregation is redistributed once more based on the GROUP BY expressions to aggregate the final result.

Local aggregation the first redistribution can be considered if it provides benefits and does not significantly impact parallel efficiency.

Note that, due to the extra redistribution and spooling, careful consideration of when this optimization actually provides benefits is needed.

Choosing n

Depending on what information is available to the optimizer, the value n chosen could be based on the set of skewed values and their frequencies for any GROUP BY expressions of the large relation, the processing module skew for the large relation (if coming from a table or would be currently spooled locally), the number of rows in the large relation (RL), number of unique values for the GROUP BY expressions, and the number of processing modules (A). These can be obtained through estimates, collected statistics, dynamic statistics, etc. Note that the number of processing modules must be greater than 1 to use this method.

A simple choice for n is the number of processing modules. A larger value may be appropriate to avoid collisions.

Collisions

For a small number of processing modules, uneven redistribution or an even more skewed distribution could occur. For example, with 4 processing modules, n=4, and skewed value of x in the large relation for GROUP BY x, redistributing on (x, 1), (x, 2), (x, 3), and (x, 4) has a 1.5625% probability of putting all the rows with a value of x on the same processing (a collision) and thereby not reduce the skew. There is only a 9.375% probability that rows for these values will be distributed among all 4 processing modules.

To avoid this issue, the method could be used with a very large value for n.

Alternatively, collisions can be avoided by, instead of directly using the values from the domain of unique values for the redistribution of the large relation, using these values to index into an array K[ ], and using the values from the array for the redistribution. Then the number of processing modules can be used as the value for n. Populating the array K[ ] is done as described above.

Data Block Redistribution

Instead of distributing entries of the large relation as described above, data blocks of entries can be distributed in the same way for more efficient redistribution without a significant increase in skew as long as the large relation has a relatively large number of data blocks compared to the number of processing modules.

Parallel Execution on a Processing Module Using Partitioning

By partitioning the large relation rows on each processing module, as discussed above in connection with Table 5, actions to do an aggregation for each partition can be generated to be run in parallel. In the case of a Teradata system, the usual limits on how many actions can be running at one time in parallel would apply. Alternatively, a single action could initiate some number of threads to process partitions in parallel. The aggregations running in parallel should be able to write their results to the same spool or the separate spools are written with extra retrieve steps to combine the spools into one spool. With separate spools, other operations could be applied to the spools in parallel when possible and combining the results could be delayed.

Parallel execution on a processing module using partitioning is not specific to the skew reduction method described herein but could be applicable to other aggregation methods and other database operations.

Figure 5:
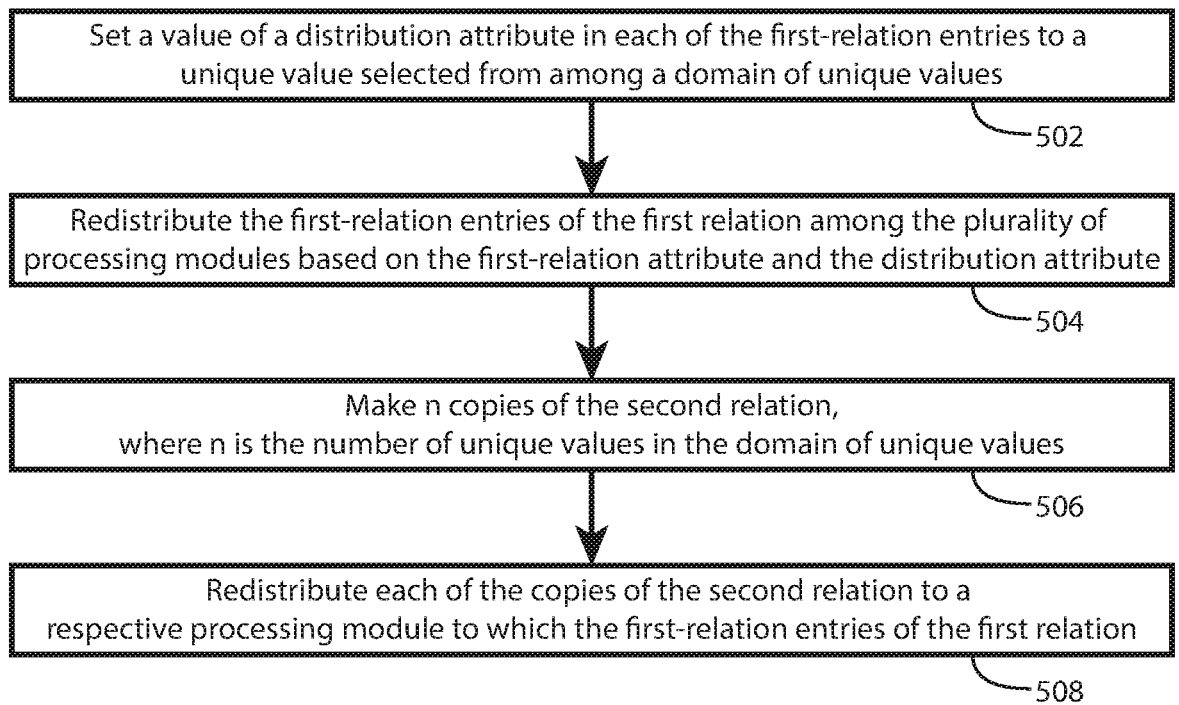
FIG. 5 is a flow chart illustrating redistributing a first relation and a second relation.
Figure 6:
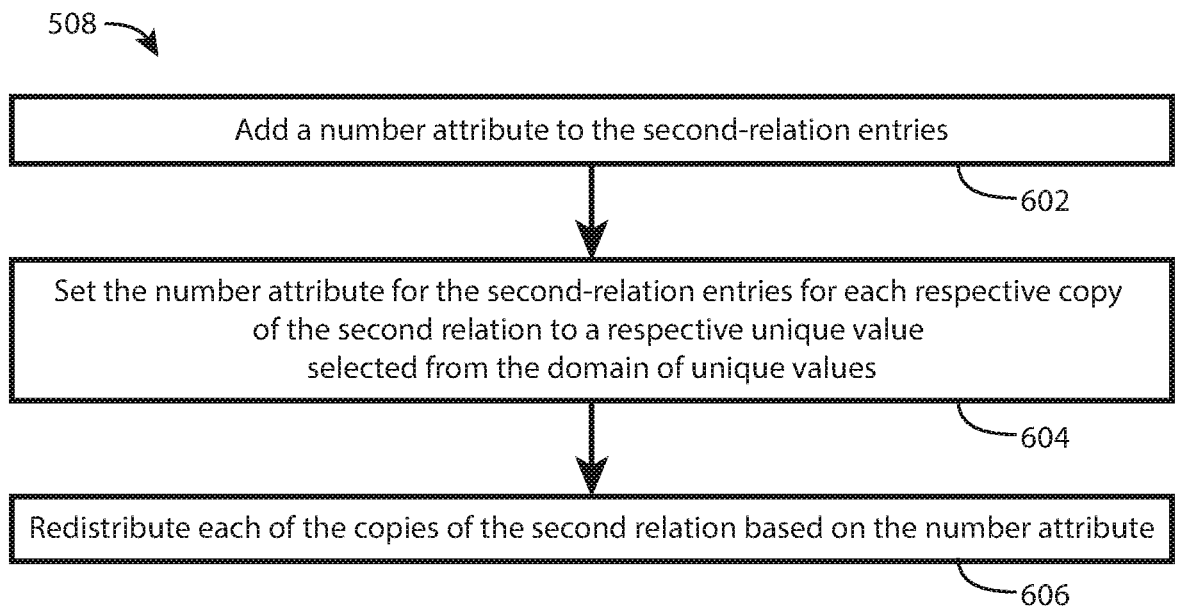
FIG. 6 is a flow chart illustrating details of redistributing a second relation.

FIG. 5 is a flow chart illustrating redistributing a first relation and a second relation. FIG. 6 is a flow chart illustrating details of redistributing a second relation. A file system, such as DBS 100, resides on a plurality of processing modules, such as processing modules $110_{1 \ldots N}$. The file system includes a first relation, such as large relation 402, having a plurality of first-relation entries. Each of the plurality of first-relation entries has a first-relation attribute that is of interest in a database operation, such as a join, an aggregation, or a computational operation. The file system includes a second relation, such as small relation 404, having a plurality of second-relation entries. Each of the plurality of second-relation entries has a second-relation attribute that is of interest in the computational operation.

A value of a distribution attribute (which is a pre-existing attribute or a new attribute) in each of the first-relation entries is set to a unique value selected from among a domain of unique values (block 502). The first-relation entries of the first relation are redistributed among the plurality of processing modules based on the first-relation attribute and the distribution attribute (block 504). n copies of the second relation are made, where n is the number of unique values in the domain of unique values (block 507). Each of the copies of the second relation is redistributed to a respective processing module to which the first-relation entries of the first relation (block 508).

Redistribution of the copies of the second relation (block 508), shown in more detail in FIG. 6, is done by adding a number attribute to the second-relation entries (block 602). Alternatively, as mentioned above, a pre-existing attribute in the second relation could be used. The process continues by setting the number attribute for the second-relation entries for each respective copy of the second relation to a respective unique value selected from the domain of unique values (block 604). The process continues by redistributing each of the copies of the second relation based on the number attribute (block 606).

Once the first relation and the second relation are redistributed as shown in FIGS. 5 and 6, the computational operation is performed to produce a result.

The operations of the flow diagrams are described with references to the systems/apparatus shown in the block diagrams. However, it should be understood that the operations of the flow diagrams could be performed by embodiments of systems and apparatus other than those discussed with reference to the block diagrams, and embodiments discussed with reference to the systems/apparatus could perform operations different than those discussed with reference to the flow diagrams.

The word "coupled" herein means a direct connection or an indirect connection.

The text above describes one or more specific embodiments of a broader invention. The invention also is carried out in a variety of alternate embodiments and thus is not limited to those described here. The foregoing description of an embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer program, stored in a non-transitory computer-readable medium, on which is recorded a computer program, the computer program comprising executable instructions, that, when executed, perform a method for performing a database operation in a file system residing on a plurality of processing modules, the file system including a first relation having a plurality of first-relation entries, each of the plurality of first-relation entries having a first-relation attribute that is of interest in the database operation, the file system including a second relation having a plurality of second-relation entries, each of the plurality of second-relation entries having a second-relation attribute that is of interest in the computational operation, the method comprising:
setting a value of a distribution attribute in each of the first-relation entries to a unique value selected from among a domain of unique values;
redistributing the first-relation entries of the first relation among the plurality of processing modules based on the first-relation attribute and the distribution attribute;
making n copies of the second relation, where n is the number of unique values in the domain of unique values;
redistributing each of the copies of the second relation to a respective processing module to which the first-relation entries of the first relation have been redistributed by:
setting a number attribute for the second-relation entries for each respective copy of the second relation to a respective unique value selected from the domain of unique values, and
redistributing each of the copies of the second relation based on the number attribute; and
performing the computational operation to produce a result.

2. The computer program of claim 1 wherein the database operation comprises one of a join, an aggregation, or a computational operation.

3. The computer program of claim 1 wherein the first-relation entries are rows in the first relation and the first-relation attribute is a column in the first-relation entries.

4. The computer program of claim 1 wherein the first-relation entries comprise a plurality of first-relation attributes.

5. The computer program of claim 1 wherein the unique value assigned to the distribution attribute is selected by one of a random selection or a round robin selection.

6. The computer program of claim 1 further comprising adding the distribution attribute to the first-relation entries.

7. The computer program of claim 6 wherein the distribution attribute comprises a plurality of attributes.

8. The computer program of claim 1 wherein redistributing each of the copies of the second relation to a respective processing module to which the first relation entries of the first relation have been redistributed comprises copying a respective complete copy of the second relation to each of the processing modules.

9. The computer program of claim 1 wherein the first relation has a first-relation-count of entries, the second relation has a second-relation-count of entries, the number of processing modules in the plurality of processing modules is processing-module-count, and n is determined based on the first-relation-count, the second-relation-count, and the processing-module-count.

10. A method for performing a database operation in a file system residing on a plurality of processing modules, the file system including a first relation having a plurality of first-relation entries, each of the plurality of first-relation entries having a first-relation attribute that is of interest in the database operation, the file system including a second relation having a plurality of second-relation entries, each of the plurality of second-relation entries having a second relation attribute that is of interest in the computational operation, the method comprising:
setting a value of a distribution attribute in each of the first-relation entries to a unique value selected from among a domain of unique values;
redistributing the first-relation entries of the first relation among the plurality of processing modules based on the first-relation attribute and the distribution attribute;
making n copies of the second relation, where n is the number of unique values in the domain of unique values;

redistributing each of the copies of the second relation to a respective processing module to which the first-relation entries of the first relation have been redistributed by:
   setting a number attribute for the second-relation entries for each respective copy of the second relation to a respective unique value selected from the domain of unique values, and
   redistributing each of the copies of the second relation based on the number attribute; and
performing the computational operation to produce a result.

11. The method of claim 10 wherein the database operation comprises one of a join, an aggregation, or a computational operation.

12. The method of claim 10 wherein the file system comprises one of a relational database system, a hierarchical database system, a columnar database system, or a shared-nothing database system.

13. The method of claim 10 wherein the first-relation entries are rows in the first relation and the first-relation attribute is a column in the first-relation entries.

14. The method of claim 10 wherein the first-relation entries comprise a plurality of first-relation attributes.

15. The method of claim 10 wherein the unique value assigned to the distribution attribute is selected by one of a random selection or a round robin selection.

16. The method of claim 10 further comprising:
   adding the distribution attribute to the first-relation entries; and
   adding the number attribute to the second-relation entries.

17. The method of claim 16 wherein the distribution attribute comprises a plurality of attributes.

18. The method of claim 15 wherein the first relation has a first-relation-count of entries, the second relation has a second-relation-count of entries, the number of processing modules in the plurality of processing modules is processing-module-count, n is determined based on the first-relation-count, the second-relation-count, and the processing-module-count.

* * * * *